UNITED STATES PATENT OFFICE.

KATHARINE L. CHRISTMAN, OF NEW YORK, N. Y., EXECUTRIX OF CHARLES H. CHRISTMAN, DECEASED.

MARINE ENAMEL OR PAINT.

SPECIFICATION forming part of Letters Patent No. 531,610, dated December 25, 1894.

Application filed March 20, 1894. Serial No. 504,464. (No specimens.)

*To all whom it may concern:*

Be it known that CHARLES H. CHRISTMAN, deceased, late a citizen of the United States, and a resident of New York city, in the county of New York and State of New York, did in his lifetime invent a certain new and useful Improvement in Marine Enamel, of which the following is a full, clear, and exact description, such as will enable others skilled in the art to which it appertains to make and use the same.

The object of this invention is the production of a water repellent coating compound or composition of general utility for exposed surfaces where a uniform, hard, durable surface is required, but of especial value for ships, sea going vessels, and marine structures exposed to salt water, and whereon barnacles or like accretions are liable to form.

The ingredients which enter into said compound or enamel, are as follows: the resinous juice of the Japan sumac, (*Rhus vernicifera*,) the resinous juice of the Mexican or African sumac or copal of commerce (*Rhus copallina*), Indian linseed oil (or *Linaceæ kitath*), common English linseed oil of commerce; a drier, and if desired a coloring matter of a nature which will not change the characteristics of the enamel.

The formula for the compound is as follows: linaceæ kitath, three (3) pints; rhus vernicifera, two (2) pints; English linseed oil, two (2) pints; copal varnish, one (1) pint; drier one (1) gill.

The resins to be fused or melted, and the oils heated and gradually added, after which the drier may be added, and a coloring matter, if desired.

Having thus described the invention of the said CHARLES H. CHRISTMAN, deceased, what is claimed, and desired to be secured by Letters Patent, is—

An enamel composition, composed of linacæ kitath, rhus vernicifera, English linseed oil, copal varnish, and a drier, in substantially the relative proportions, and for the purposes specified.

In testimony whereof I affix my signature, in the presence of two witnesses, this 16th day of March, 1894.

KATHARINE L. CHRISTMAN,
*Executrix of the last will and testament of Charles H. Christman, deceased.*

Witnesses:
  OWEN WARD,
  CLARENCE R. COMÉS.